United States Patent [19]
Finley et al.

[11] 3,869,438
[45] Mar. 4, 1975

[54] PROCESS FOR ISOLATING OIL-SEED PROTEINS USING LIQUID FLUOROCARBONS

[75] Inventors: John W. Finley; Earl Hautala, both of Martinez, Calif.; Charles E. Walker, Valley City, N. Dak.

[73] Assignee: The United States of America as represented by the Secretary of Agriculture, Washington, D.C.

[22] Filed: May 20, 1974

[21] Appl. No.: 471,627

Related U.S. Application Data

[62] Division of Ser. No. 342,119, March 16, 1973, Pat. No. 3,828,017.

[52] U.S. Cl. .......................................... 260/123.5
[51] Int. Cl. ........................................... A23j 1/14
[58] Field of Search ................................ 260/123.5

[56] References Cited
UNITED STATES PATENTS
2,534,227  12/1950  Calvert ........................... 260/123.5
2,635,094  4/1953   Belter et al. ..................... 260/123.5
3,065,141  11/1962  Gessler .......................... 260/112 UX
3,105,012  9/1963   Brandon et al. ................. 260/112 R
3,520,868  6/1970   Henderson et al. ............. 260/112 R Primary Examiner—Howard E. Schain
Attorney, Agent, or Firm—M. Howard Silverstein; Max D. Hensley; William Takacs

[57] ABSTRACT

Cereal or other protein-containing material is ground and mixed with a liquid fluorocarbon whose density is adjusted to 1.35 to 1.45. The resulting slurry is centrifuged, whereby to produce a protein fraction floating on the surface of the liquid, a bottom phase composed mainly of starch, and an intermediate fluorocarbon phase containing fat. The protein phase can be easily separated from the remainder, dried, and used as a dietary supplement or The like. the starch and fat components can also be readily separated from the centrifuged slurry.

7 Claims, No Drawings

PROCESS FOR ISOLATING OIL-SEED PROTEINS USING LIQUID FLUOROCARBONS

This is a division of our copending application Ser. No. 342,119, filed Mar. 16, 1973, now U.S. Pat. No. 3,828,017.

A non-exclusive, irrevocable, rolalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of novel processes for separating proteins from materials containing the same. Also included are novel processes for isolating starch and fats, as well as proteins, from various source materials. Further objects of the invention will be evident from the following description wherein parts and percentages are by weight unless otherwise specified.

It is well-known that grains and other seed materials contain valuable proteins plus various other components, such as starch and oil. For certain purposes it is desirable to treat these materials to obtain compositions which contain an increased proportion of protein. These high-protein concentrates can be used to fortify foods and beverages in order to increase their nutritional value. In conventional separation procedures, great difficulty is encountered due to the presence of fat. As a consequence, protein separation methods are practiced only on defatted materials, i.e., material from which the fat has already been removed. Thus, such separation techniques necessarily involve at least two steps. In addition, conventional procedures are generally cumbersome because of the tendency of cereal products such as flours to form sticky, coherent masses or doughs when incorporated with water and subjected to such manipulations as centrifugation.

The invention described herein obviates the problems outlined above. The invention makes it possible to isolate protein concentrates having a protein content as high as 60–90% by application of a simple and inexpensive procedure.

A particular advantage of the invention is that the defatting step required in conventional methods of separation is obviated. As a result, the invention can be practiced directly on material containing its natural and full content of oil.

Another important advantage of the invention is that the desired separation is achieved without the formation of doughs or other sticky, hard-to-handle, coherent masses.

Basically, the practice of the invention involves the following operations: The source material is ground, then mixed with a liquid fluorocarbon whose density is adjusted to 1.35–1.45. The resulting slurry is centrifuged to produce a 3-component system: a protein fraction floating on the surface of the liquid, a bottom phase composed mostly of starch, and an intermediate fluorocarbon layer. In the event that the source material contained fat, this intermediate phase contains this fat dissolved therein. The protein and starch phases are collected, washed, and dried. The fat can be readily recovered from the fluorocarbon phase by applying evaporation to remove the fluorocarbon.

The source material treated in accordance with the invention includes grains of all kinds such as wheat, rye, oats, barley, triticale, corn, rice, etc., and products made from grains such as flours, peeled grains, germ, etc. The invention can also be practiced on oil seeds such as cotton seed, rape seed, sunflower seed, sesame seed, and the like, and on other protein-containing sources such as peas, beans, nuts, alfalfa or the juice therefrom, comminuted fish, etc. In short, the invention can be successfully applied to any material containing sufficient protein to make its recovery worthwhile. The source material to which the invention is applied should be in a finely-divided condition. Thus, if the material is not already in such condition, it is subjected to grinding, ball-milling, turbo-milling or other conventional pulverization step to reduce it to a powdery or floury state.

Monofluorotrichloromethane is preferred for use as the fluorocarbon. However, for purposes of the invention one may use any fluorocarbon that is volatile so that it can be efficiently removed from the product and efficiently recovered for reuse. Typical fluorocarbons that can be used in accordance with the invention are listed in the following table.

| Solvent | Formula | Boiling point °F. | °C. |
|---|---|---|---|
| Difluoromonochloromethane | $CHClF_2$ | −41.4 | −40.8 |
| Pentafluoromonochloroethane | $CClF_2-CF_3$ | −37.7 | −38.7 |
| Difluorodichloromethane | $CCl_2F_2$ | −21.6 | −29.8 |
| 1,1-Difluoroethane | $CH_2-CHF_2$ | −11.2 | −24.0 |
| Symmetrical tetrafluorodichloroethane | $CClF_2-CClF_2$ | 38.4 | 3.6 |
| Monofluorodichloromethane | $CHCl_2F$ | 48.1 | 8.9 |

—Continued

| Solvent | Formula | Boiling point 0° F. | °C. |
| --- | --- | --- | --- |
| Monofluorotrichloromethane | $CCl_3F$ | 74.8 | 23.8 |
| Symmetrical tetrafluorodibromoethane | $CBr_2F_2-CBr_2F_2$ | 117.5 | 47.5 |
| Trifluorotrichloroethane | $CCl_2F-CClF_2$ | 117.6 | 47.6 |
| Octafluorocyclobutane | 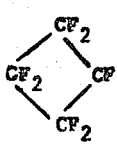 | 21.1 | -6.0 |

It is evident from the preceding table that some of the fluorocarbons have boiling points below usual room temperatures. When such substances are used, it is evident that the treatment should be carried out under refrigeration so that the selected fluorocarbon is maintained in a liquid state.

DETAILED DESCRIPTION OF THE ISOLATION

In a practice of the invention, the pulverized source material is dispersed in a liquid fluorocarbon to form a slurry. Dispersion is accomplished by subjecting the mixture to agitation, for example, by the use of a blender, or by applying sonication, colloid milling, or the like. Generally, the liquid fluorocarbon is used in a proportion of about 5 to 50 parts, preferably about 10–20 parts, per part of source material.

In a preferred embodiment of the invention whereby to maximize the separation of protein from other components, the source material is moistened with a small amount of water—about 2 to 4%—prior to slurrying with the fluorocarbon. For the same purpose it is also preferred to incorporate a small proportion—about 0.1 to 2%—of glacial acetic acid in the fluorocarbon before the source material is dispersed therein.

A critical feature of the fluorocarbon liquid is its density. For the purposes of the invention a density of 1.35 to 1.45 is desired. In this density range, maximum separation of protein, starch, and fat is realized. To adjust the density, one adds to the fluorocarbon a low-density solvent in the amount necessary to attain the density level set forth above. As the low-density solvent hexane is preferred. However, one can use other volatile low-density inert solvents which are miscible with fluorocarbons, such as pentane, heptane, petroleum ether, or other volatile hydrocarbon or hydrocarbon mixture. Within the stated range of 1.35 to 1.45, the optimum density for any particular source material can be readily determined by small-scale pilot trials wherein varying amounts of low-density solvent are incorporated with the fluorocarbon.

Having dispersed the source material in the fluorocarbon liquid, the resulting slurry is centrifuged. In the event that a very volatile fluorocarbon is used, the centrifugation should be carried out under refrigeration to maintain the fluorocarbon in the liquid state.

The centrifugation causes the partitioning of the slurry into a 3-phase system: A solid phase floating on the liquid, a dense bottom phase, and an intermediate fluorocarbon liquid phase. The surface phase, floating on the liquid, is composed mostly of protein and can be collected by filtration or decanting. The collected semi-solid material upon drying forms a granular, free-flowing solid which is a rich protein concentrate, containing 60 to 90% protein, depending on the nature of the source material. As such, it is an excellent product for use as a dietary supplement in foods and feeds.

The bottom phase contains essentially all the starch from the source material. This starch phase, being in a granular condition, completely free from stickiness, can be readily separated from the remainder of the system, and can be readily processed as by washing with a small amount of a fluorocarbon and drying to prepare a high-grade starch for any desired use. It is important to note that this bottom phase may contain sugars or bone fragments rather than starch. The composition of this phase depends on the nature of the source material. Thus, for example, if one begins with comminuted fish, the bottom phase will contain mostly bone fragments, whereas, with soybean or alfalfa, the bottom phase will contain mostly sugars.

The intermediate fluorocarbon phase contains the fat derived from the source material in the event that fat was originally present therein. By subjecting the liquid phase to distillation, the fluorocarbon is recovered for reuse and the fat is collected as the distillation residue.

The invention is further demonstrated by the following illustrative examples.

EXAMPLE 1

Wheat flour (50 g.) was added to a solution of 100 ml. of monofluorotrichloromethane (Freon 11) containing 2 ml. of glacial acetic acid. The mixture was stirred for 15 minutes. A 10-ml. aliquot of this mixture was diluted with 80 ml. of Freon 11 and 10 ml. of hexane (density of solution was 1.424). This mixture was blended for 30 seconds and then was centrifuged for 5 minutes at 5,000 rpm. It was observed that there was formed a bottom starch phase, an intermediate liquid phase, and a solid phase floating atop the supernatant liquid phase.

The fraction floating on the surface of the liquid was filtered off and dried to yield 0.44 g. of protein concentrate containing 85% protein on a dry basis.

The bottom phase was separated easily from the liquid by decantation and was dried to yield 3.25 g. of starch containing only 1.2% protein on a dry basis.

EXAMPLE 2

Soybeans were ground and ball-milled and 25 g. thereof was subjected to the treatment as described in Example 1.

The floating protein phase was filtered off and dried to yield 1.42 g. of product containing 82.3% protein.

The bottom phase was dried, yielding 0.54 g. of carbohydrate containing 1.4% protein.

The intermediate liquid phase was evaporated to yield 0.50 g. of fat containing less than 0.1% protein.

Having thus described the invention, we claim:

1. A process for isolating protein from a pulverized oil seed, which comprises
    a. forming a slurry of said pulverized oil seed in a liquid fluorocarbon containing sufficient low-density hydrocarbon solvent to provide a density of 1.35 to 1.45,
    b. centrifuging the slurry to partition the components of the oil seed into separate fractions, including a protein fraction floating on said fluorocarbon liquid, and
    c. collecting said protein fraction.

2. The process of claim 1 wherein the pulverized oil seed is pulverized soybean.

3. The process of claim 1 wherein the liquid fluorocarbon is monofluorotrichloromethane.

4. The process of claim 1 wherein the low-density hydrocarbon solvent is hexane.

5. The process of claim 1 wherein 0.1 to 2% of glacial acetic acid is incorporated into the liquid fluorocarbon prior to formation of the slurry.

6. The process of claim 1 wherein 2 to 4% of water is incorporated with the pulverized oil seed prior to formation of the slurry.

7. A process for isolating protein from pulverized soybean, which comprises
    a. moistening the pulverized soybean with 2 to 4% water,
    b. forming a slurry of the moistened pulverized soybean in monofluorotrichloromethane containing 0.1 to 2% glacial acetic acid and sufficient hexane to provide a density of 1.424,
    c. centrifuging the slurry to partition the components of the soybean into separate fractions, including a protein fraction floating on the said fluorocarbon liquid, and
    d. collecting said protein fraction.

* * * * *